(12) United States Patent
Pu et al.

(10) Patent No.: US 9,679,330 B2
(45) Date of Patent: Jun. 13, 2017

(54) INTERFACE FOR ENHANCED CONTINUITY OF BROWSING EXPERIENCE

(75) Inventors: Daniel Emil Pu, San Francisco, CA (US); Monika E. Gromek, Oakland, CA (US); William Martin Bachman, San Jose, CA (US); Joseph Andrew Magnani, San Francisco, CA (US); Taylor Gerard Carrigan, San Francisco, CA (US); Juliana Diaz Delgado, San Jose, CA (US); Brendon Manwaring, San Francisco, CA (US); Joshua Kane McGlinn, Sunnyvale, CA (US); Jeffrey L. Robbin, Los Altos, CA (US); Joe Howard, San Jose, CA (US); Elizabeth Caroline Furches Cranfill, San Francisco, CA (US); Alexandrea Anderson, San Jose, CA (US)

(73) Assignee: Apple Inc., Cupertino, CA (US)

(*) Notice: Subject to any disclaimer, the term of this patent is extended or adjusted under 35 U.S.C. 154(b) by 717 days.

(21) Appl. No.: 13/609,210

(22) Filed: Sep. 10, 2012

(65) Prior Publication Data
US 2013/0332311 A1 Dec. 12, 2013

Related U.S. Application Data

(60) Provisional application No. 61/657,869, filed on Jun. 10, 2012.

(51) Int. Cl.
G06Q 30/00 (2012.01)
G06Q 30/06 (2012.01)
G06F 17/30 (2006.01)

(52) U.S. Cl.
CPC ..... G06Q 30/0641 (2013.01); G06F 17/3089 (2013.01)

(58) Field of Classification Search
CPC ..................................... G06Q 30/00
See application file for complete search history.

(56) References Cited

U.S. PATENT DOCUMENTS 6,338,059 B1 * 1/2002 Fields ............... G06F 17/30864
707/706
6,535,912 B1 3/2003 Anupam et al.
(Continued)

OTHER PUBLICATIONS

Drupal, "Context Overlay", Drupal.org, dates Sep. 13, 2012.*
(Continued)

Primary Examiner — Mark Fadok
(74) Attorney, Agent, or Firm — Polsinelli LLP

(57) ABSTRACT

Providing an online store interface that maintains continuity of a user browsing experience by layering a product view on top of referring product views or online-store pages such that a user can navigate back to the referring page without needing the previous page to reload, and re-navigate to the point the user left off. Providing the ability for an item preview to continue even when a user navigates the online store interface away from the preview page further preserves browsing continuity. The present technology also provides a mechanism for allowing users to specify favorite categories and have them listed as tabs in the user interface when the online store is browsed with an appropriate device.

21 Claims, 20 Drawing Sheets

(56) References Cited

U.S. PATENT DOCUMENTS

| | | | |
|---|---|---|---|
| 7,565,308 B1* | 7/2009 | Bollay | G06Q 30/06 705/26.41 |
| 7,801,824 B1 | 9/2010 | Bryar et al. | |
| 7,849,419 B2* | 12/2010 | Tudor | G06F 3/0481 715/733 |
| 7,979,457 B1 | 7/2011 | Garman | |
| 8,578,261 B1* | 11/2013 | Gupta | G06F 17/30899 715/205 |
| 8,677,273 B2* | 3/2014 | Rowell | G06F 3/04817 715/713 |
| 2003/0035007 A1* | 2/2003 | Wugofski | G06F 9/4443 715/764 |
| 2004/0111332 A1* | 6/2004 | Baar | G06F 3/0481 705/50 |
| 2005/0021478 A1 | 1/2005 | Gautier et al. | |
| 2005/0033657 A1 | 2/2005 | Herrington et al. | |
| 2005/0177853 A1 | 8/2005 | Williams et al. | |
| 2006/0155989 A1* | 7/2006 | Nishimoto et al. | 713/166 |
| 2007/0033147 A1* | 2/2007 | Kaburagi | 705/59 |
| 2007/0118847 A1* | 5/2007 | Sugimoto et al. | 725/1 |
| 2007/0168462 A1 | 7/2007 | Grossberg et al. | |
| 2007/0219875 A1 | 9/2007 | Toulotte | |
| 2008/0270909 A1* | 10/2008 | Kaufman | G06Q 20/12 715/738 |
| 2009/0070232 A1* | 3/2009 | Milton | G06Q 30/0283 705/26.1 |
| 2009/0100020 A1* | 4/2009 | Reddy | G06Q 30/0603 |
| 2009/0119589 A1* | 5/2009 | Rowell | G06F 3/04817 715/716 |
| 2009/0197582 A1* | 8/2009 | Lewis et al. | 455/414.2 |
| 2009/0199242 A1* | 8/2009 | Johnson | G06F 17/30781 725/46 |
| 2009/0271283 A1* | 10/2009 | Fosnacht | G06Q 20/123 705/26.1 |
| 2010/0011354 A1 | 1/2010 | Gharabally et al. | |
| 2010/0017261 A1* | 1/2010 | Evans et al. | 705/10 |
| 2010/0114739 A1* | 5/2010 | Johnston | G06Q 30/0601 705/26.1 |
| 2010/0145804 A1* | 6/2010 | Ramer et al. | 705/14.52 |
| 2010/0192175 A1* | 7/2010 | Bachet et al. | 725/31 |
| 2010/0293490 A1* | 11/2010 | Rousso | G06Q 30/02 715/771 |
| 2011/0004533 A1* | 1/2011 | Soto | G06Q 30/00 705/27.1 |
| 2011/0106614 A1* | 5/2011 | Ramer et al. | 705/14.46 |
| 2012/0030022 A1* | 2/2012 | Ajima | G06Q 30/0255 705/14.53 |
| 2012/0095881 A1* | 4/2012 | Rothman | G06Q 30/0643 705/27.2 |
| 2012/0101944 A1 | 4/2012 | Lin et al. | |
| 2012/0110117 A1* | 5/2012 | Koreeda | 709/217 |
| 2012/0120204 A1* | 5/2012 | Ohno et al. | 348/51 |
| 2012/0123910 A1* | 5/2012 | George | G06Q 30/0641 705/27.1 |
| 2012/0131495 A1* | 5/2012 | Goossens | G06F 3/0482 715/782 |
| 2012/0131496 A1* | 5/2012 | Goossens | G06F 3/0481 715/784 |
| 2012/0166267 A1* | 6/2012 | Beatty | G06Q 30/0247 705/14.21 |
| 2012/0185349 A1* | 7/2012 | Soroca et al. | 705/26.3 |
| 2012/0210750 A1* | 8/2012 | Cooper | C03C 27/06 65/43 |
| 2012/0238255 A1* | 9/2012 | Ramer et al. | 455/414.2 |
| 2012/0266087 A1* | 10/2012 | Edecker | H04L 29/12066 715/757 |
| 2012/0290388 A1* | 11/2012 | Ganelli | G06Q 20/12 705/14.51 |
| 2013/0091462 A1* | 4/2013 | Gray et al. | 715/810 |
| 2013/0125040 A1* | 5/2013 | Smith | G06F 9/4443 715/781 |
| 2014/0052576 A1* | 2/2014 | Zelenka | G06Q 30/00 705/26.41 |
| 2014/0109166 A1* | 4/2014 | Koreeda | 725/134 |

OTHER PUBLICATIONS

International Search Report and Written Opinion from PCT Application No. PCT/US2013/041699 mailed Nov. 12, 2013, pp. 1-14.
International Preliminary Report on Patentability from PCT Application No. PCT/US2013/041699 dated Dec. 24, 2014.

* cited by examiner

INTERFACE FOR ENHANCED CONTINUITY OF BROWSING EXPERIENCE

CROSS REFERENCE TO RELATED APPLICATIONS

This application claims the benefit of U.S. Provisional Patent Application No. 61/657,869, entitled "INTERFACE FOR ENHANCED CONTINUITY OF BROWSING EXPERIENCE", filed on Jun. 10, 2012, and which is hereby expressly incorporated herein by reference in its entirety.

BACKGROUND

1. Technical Field

The present disclosure relates to a user interface and more specifically to a graphical user interface for an online store configured to be accessible by diverse device types.

2. Introduction

Current online store interfaces provide adequate ability to browse and purchase media items, but suffer from excessive context switching which interrupts the store browsing experience. Just about every new action causes navigation to a different store interface and it can be difficult to get back to a previous interface after leaving. For example, if a user is browsing one product, and then clicks on a similar product, it can be difficult for the user to return to browsing the original product.

In another example, if a user is browsing multiple items on the same page, but then selects one for further viewing or purchase, the user will find difficulty in navigating back to their previous spot on the earlier page. While some online stores provide back button browser functionality, this feature at best returns the user to the same page and maybe even returns the user to approximately the same point of vertical scroll. However, this is not adequate because modern online stores often have many items available for display in multiple sections or frames, and these frames are themselves scrollable. Merely returning to previous page might return the user to the appropriate section/frame, but will not return the user to same point of browsing within one or more multiple frames.

In another example, when an item, such as a music song is purchased, current online stores take the user out of the store interface into a media-playing interface to play the purchased song. The user then must navigate back into the online store.

In another example, when an item is previewed, such as a song, when a user browses to a different page of an online store, the preview ends. Thus a user is not able to multi-task by previewing a song while continuing to browse the online store. The browsing experience is thus fragmented.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for providing an online store interface that maintains continuity of a user browsing experience by layering a product view on top of referring product views or online-store pages such that a user can navigate back to the referring page without needing the previous page to reload, and re-navigate to the point the user left off.

Providing the ability for an item preview to continue even when a user navigates the online store interface away from the preview page further preserves browsing continuity.

The present technology also provides a mechanism for allowing users to specify favorite categories and have them listed as tabs in the user interface when the online store is browsed with an appropriate device.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 3a illustrates an exemplary interface for an item after it has been selected;

FIG. 5 illustrates an exemplary item interface;

FIG. 6a illustrates an exemplary product interface displaying a download status of items associated with the product;

FIG. 8b illustrates an exemplary history menu interface;

FIG. 9 illustrates an exemplary interface displaying category sections;

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
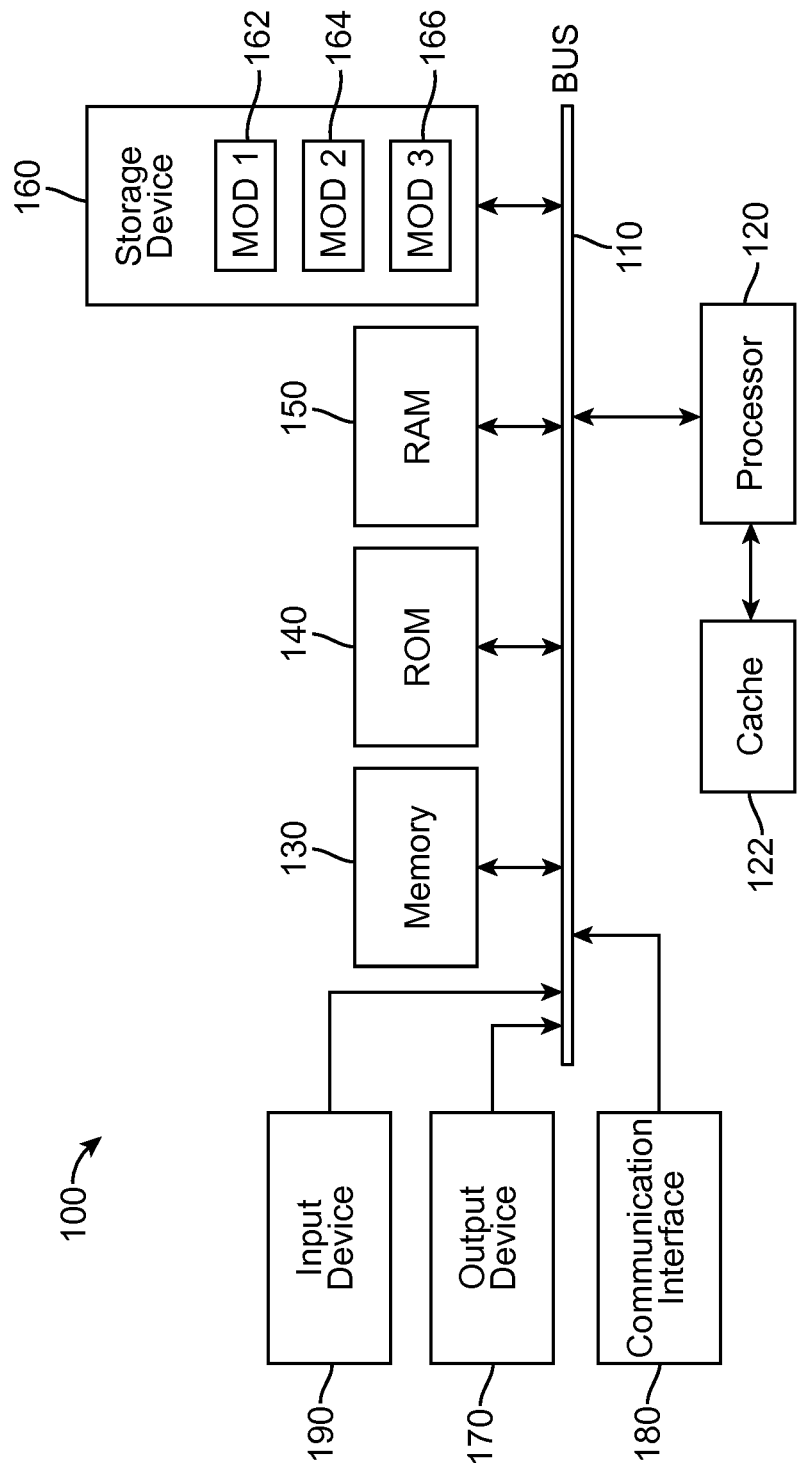
FIG. 1 illustrates an exemplary system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache of high speed memory connected directly with, in close proximity to, or integrated as part of the processor 120. The system 100 copies data from the memory 130 and/or the storage device 160 to the cache for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2A:
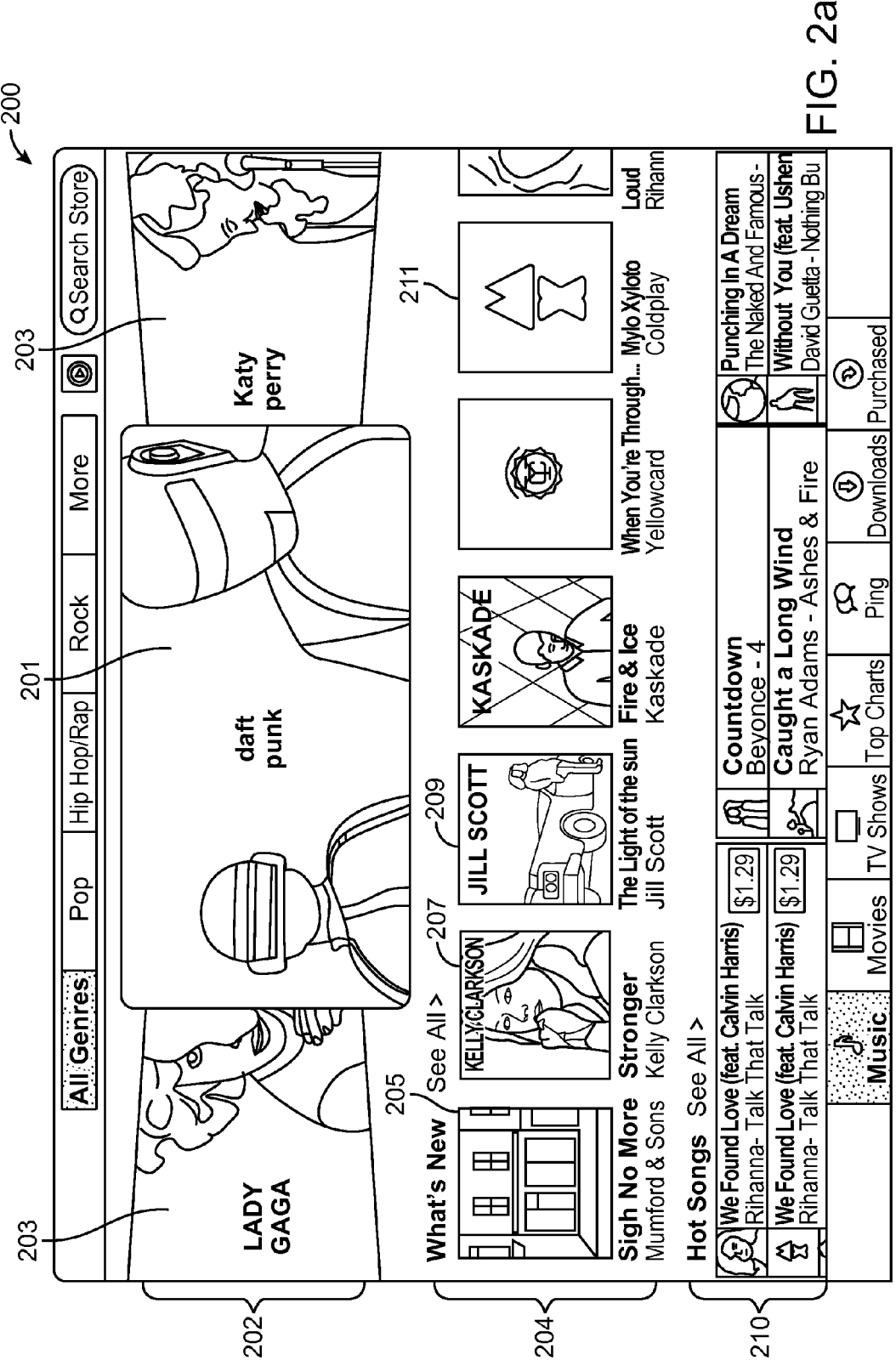
FIG. 2a illustrates an exemplary online store front page interface.

Having disclosed some components of a computing system, the disclosure now turns to FIG. 2a, which illustrates an exemplary online store front-page interface 200. In the illustrated embodiment, a front page of a music store is illustrated, but persons of ordinary skill in the art will appreciate that the page could be for any item, digital or tangible, that can be made available for purchase or browsing in an online store. It should also be appreciated that the page need not be reserved for just one type of item, e.g., music, but instead could display a diverse array of items, e.g., music and outdoor grills.

The front page of the online store is organized into multiple distinct sections—three of which 202, 204, 206, are illustrated in FIG. 2a. Section 202 presents featured products, with the primary product 201 being presented in the center of the section.

Each section can receive inputs effective to navigate through the items presented in the section. With respect to section 202 a mouse interaction, e.g., a click/grab and drag, or a touch interaction, e.g., a swipe, can move the primary product right or left to slide one of secondary products 203 into the featured position. In some aspects of section 202 there can be a limit to the number of items that can be displayed in this section. For example, if there was a limit of ten items in this section, there could be an additional seven items currently off screen.

In some embodiments the items presented in section 202 can circulate automatically, i.e., they can advance automatically at the end of a fixed interval in a looped animation sequence.

In some embodiments, each of the items presented in section 202 can be linked to a web page relevant to the illustration on the item. For example, when a selection input is received into item 201, which has a "Daft Punk" illustration, the store can present a web page of pictures of "Daft Punk" or a collection of songs or albums by "Daft Punk," etc.

In some embodiments sections 204 and 206 can also receive a mouse or touch interaction to reveal additional products by moving the displayed product left or right. In some embodiments, the products can be moved up or down to reveal additional products.

In some embodiments, the items in section 204 and 206, respectively, are grouped together as if on shelves. In such embodiments, when a mouse or touch input is received sliding one item, left, right, up, or down, all items grouped together in a shelf are moved together, and a new shelf (i.e. group of items displayed together as illustrated in section 204 and 206) can be revealed. In some aspects, one or more items can be represented on both the viewed shelf and an adjacent shelf to provide the user with some continuity when moving from one shelf to another. For example, if shelf 204 were swiped to the left so as to reveal additional items on right, item 211 (which is currently the last full item displayed on the right of the shelf) can become the first item displayed to the left of the newly displayed shelf.

Figure 2B:
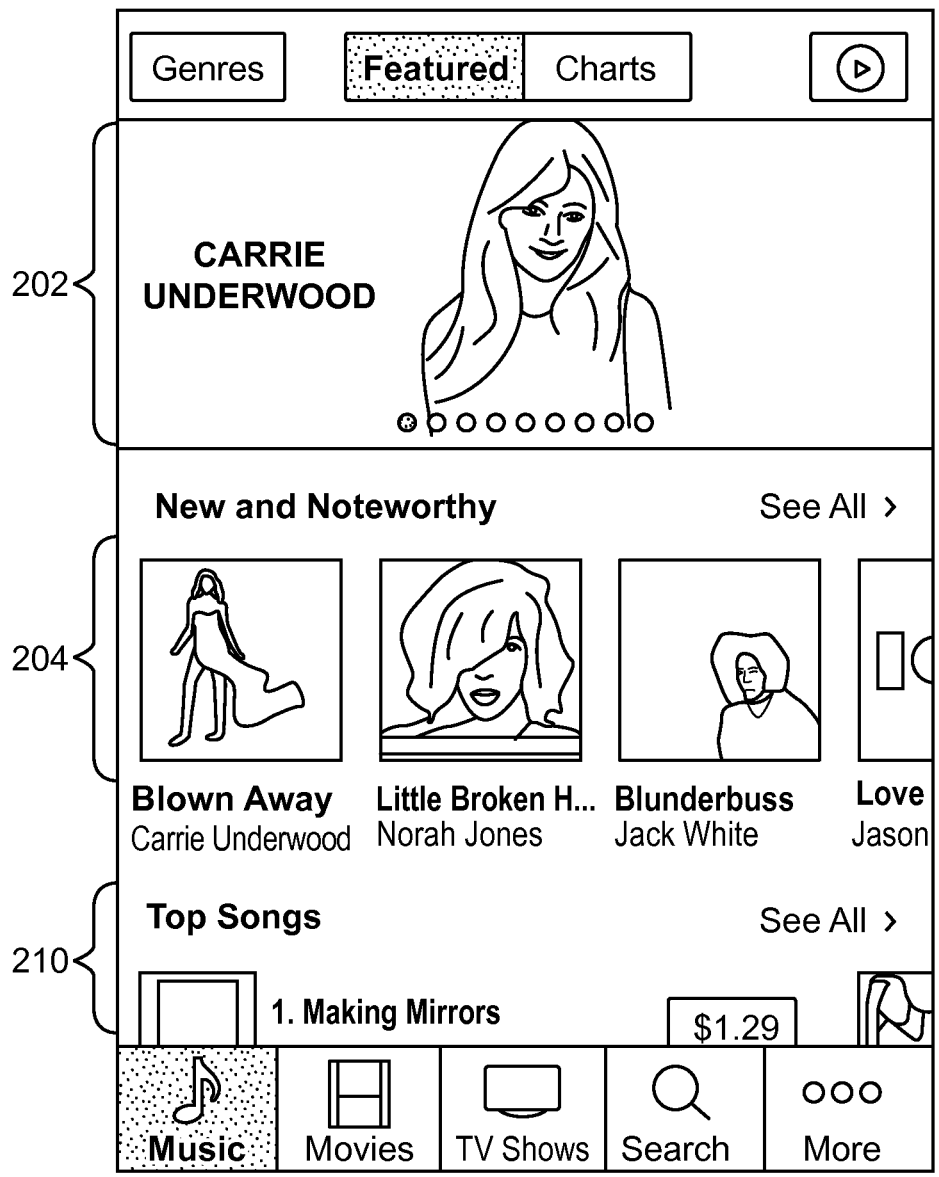
FIG. 2b illustrates an exemplary online store front page interface.

FIG. 2b illustrates a substantially similar interface as shown in FIG. 2a except that it is configured for a smaller display, e.g. a display for a mobile phone. While fewer items fit on the screen, the interface operates in substantially the same manner as described with respect to FIG. 2a.

Figure 3A:
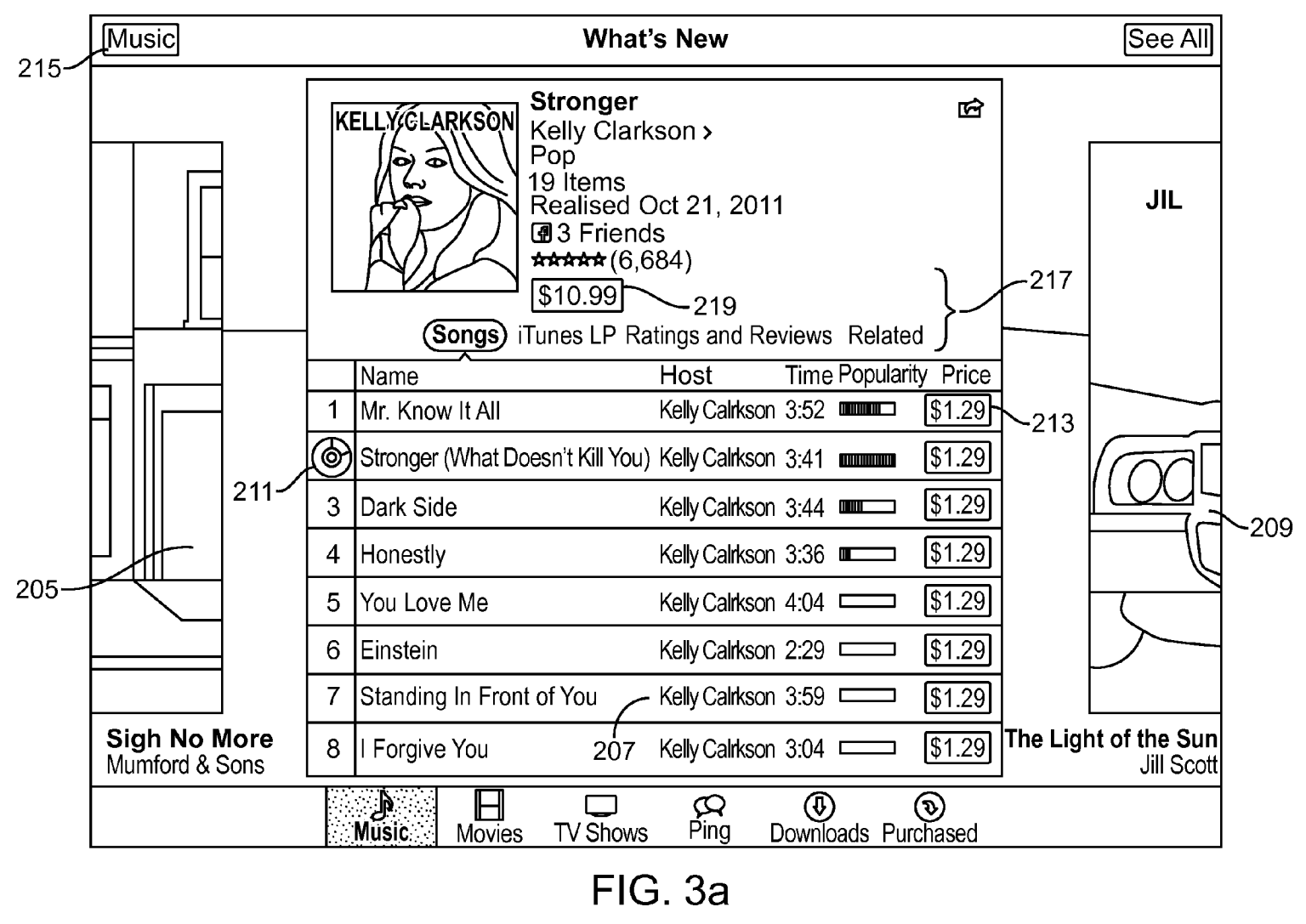

FIG. 3a illustrates an exemplary interface for an item after it has been selected, i.e., a product page. When a selection input is received in the interface illustrated in FIG. 2a, for example, item 207 is selected, item 207 and its surrounding items 205 and 209 can animate into the interface illustrated in FIG. 3a. Item 207 can enlarge and flip over in an animation sequence, while items 205 and 207 also enlarge to remain adjacent to item 207. The reverse animation can play when a selection input is received within button 215, which returns the user interface back to the music interface displayed in FIG. 2a. The reverse animation allows a user to be returned to the previous interface in the same state as they left it, i.e., they will return to the previous interface at the same place of browsing (both vertically, and horizontally, within a section).

FIG. 3a illustrates a selection of songs related to the selected album, the ability to preview a song when icon 211 or a similar icon is selected, and the ability to purchase and/or download the item when button 213 or a similar icon is selected. The listing of songs can also be scrollable to reveal additional items.

FIG. 3a also illustrates a collection of tabs 217 for navigating the selected item interface. When one of these tabs is selected, the interface below these tabs switches to match the content appropriate for the selected tab.

In some embodiments, it may be possible to navigate to other items (e.g., by selection of an item displayed under the related items tab). If an item displayed under the related items tab is selected that has its own item interface, that item interface can be displayed directly over the original item. For example, if item 230 displayed in FIG. 4a was available for selection from within the item interface for item 207 and was selected, item 230 can be displayed directly over item 207, as illustrated in FIG. 4a. This process can be repeated within the interface for item 230. The previous item's interface can be returned to the interface displayed in FIG. 3a when an input is received in button 235.

Figure 3B:
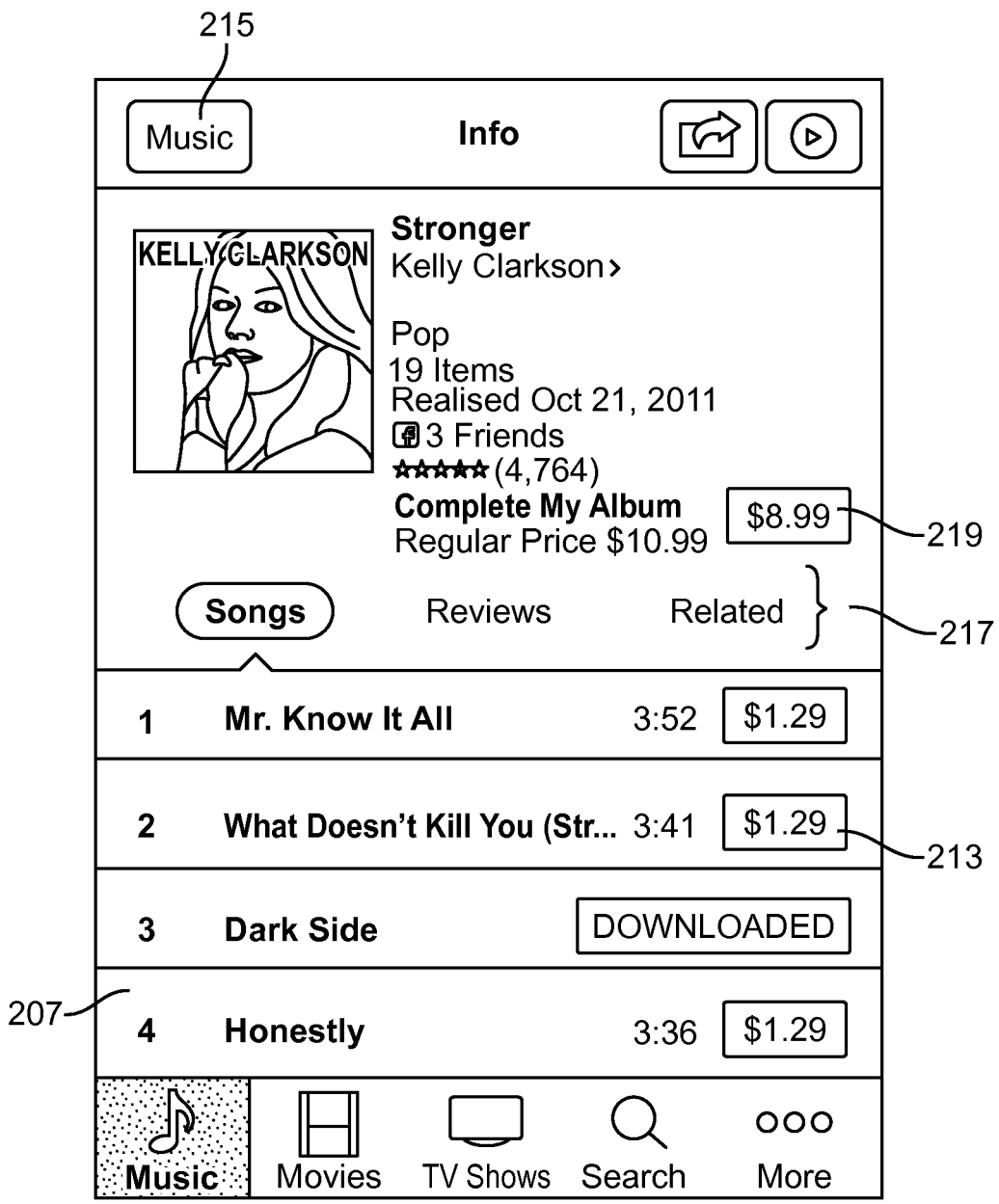
FIG. 3b illustrates an exemplary interface for an item after it has been selected.
Figure 4A:
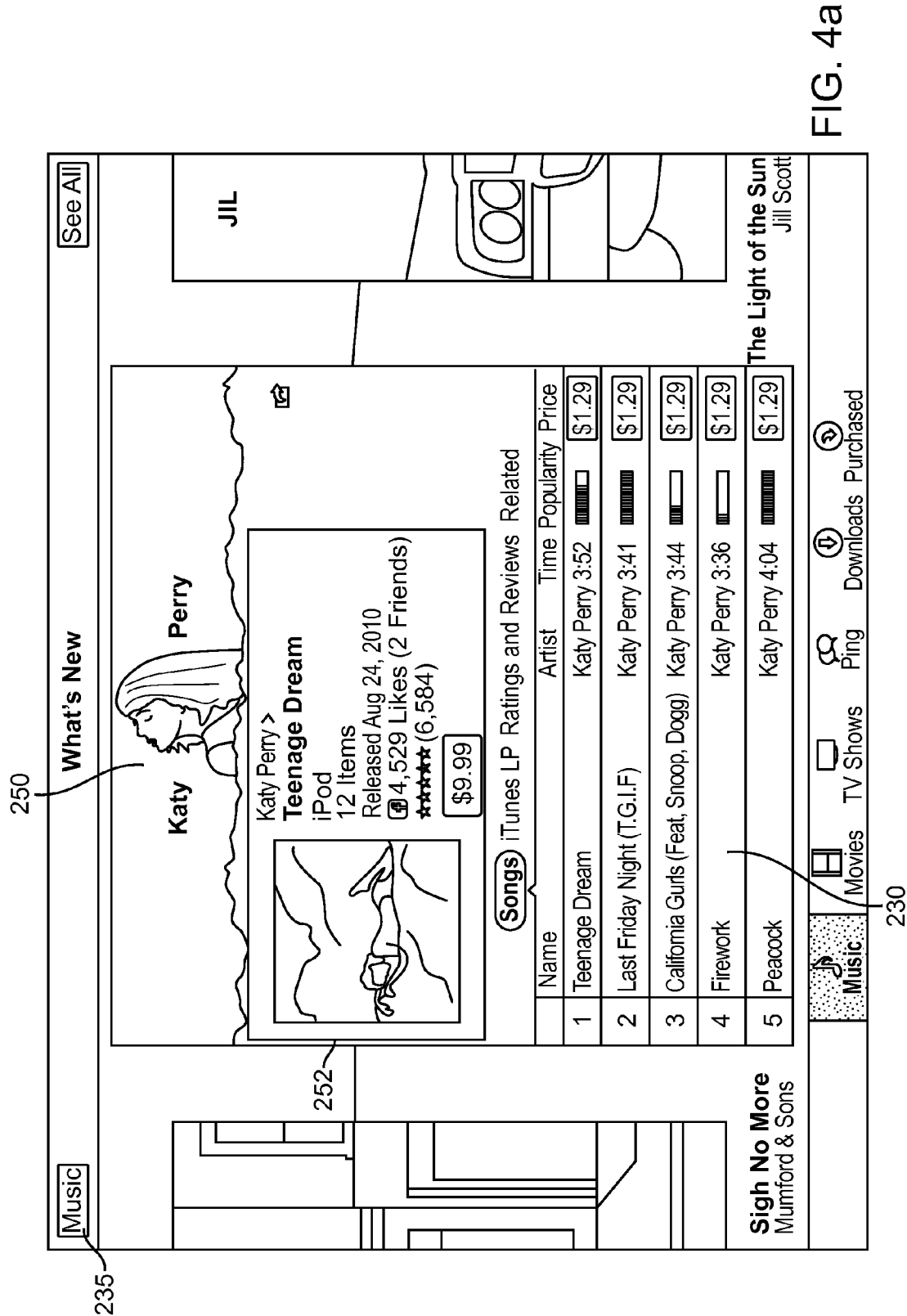
FIG. 4a illustrates an exemplary item interface.

FIG. 3b illustrates substantially the same interface as illustrated in FIG. 3a, but it is configured for a smaller display. Just as described with respect to FIG. 3a, the interface of FIG. 3b can animate into existence after a selection of an item from the interface illustrated in FIG. 2b. Likewise, when a selection of button 215 in FIG. 3b is received, the reverse animation can occur, and the interface can be returned to the interface displayed in FIG. 2b. This action gives the impression that the interface in FIG. 3b has been placed directly above the interface in FIG. 2b. Indeed, in some embodiments, the interface illustrated in FIG. 2b does in fact remain underneath the layer of the interface shown in FIG. 3b.

FIG. 4a illustrates an item interface, i.e. product page, for item 230. This interface includes additional design elements beyond that illustrated in the item interface for item 207. For example the item interface illustrated in FIG. 4a includes artist artwork 250 in addition to the album artwork and information shown within box 252 (similar artwork and information is also illustrated in the item interface illustrated in FIG. 3a).

Figure 4B:
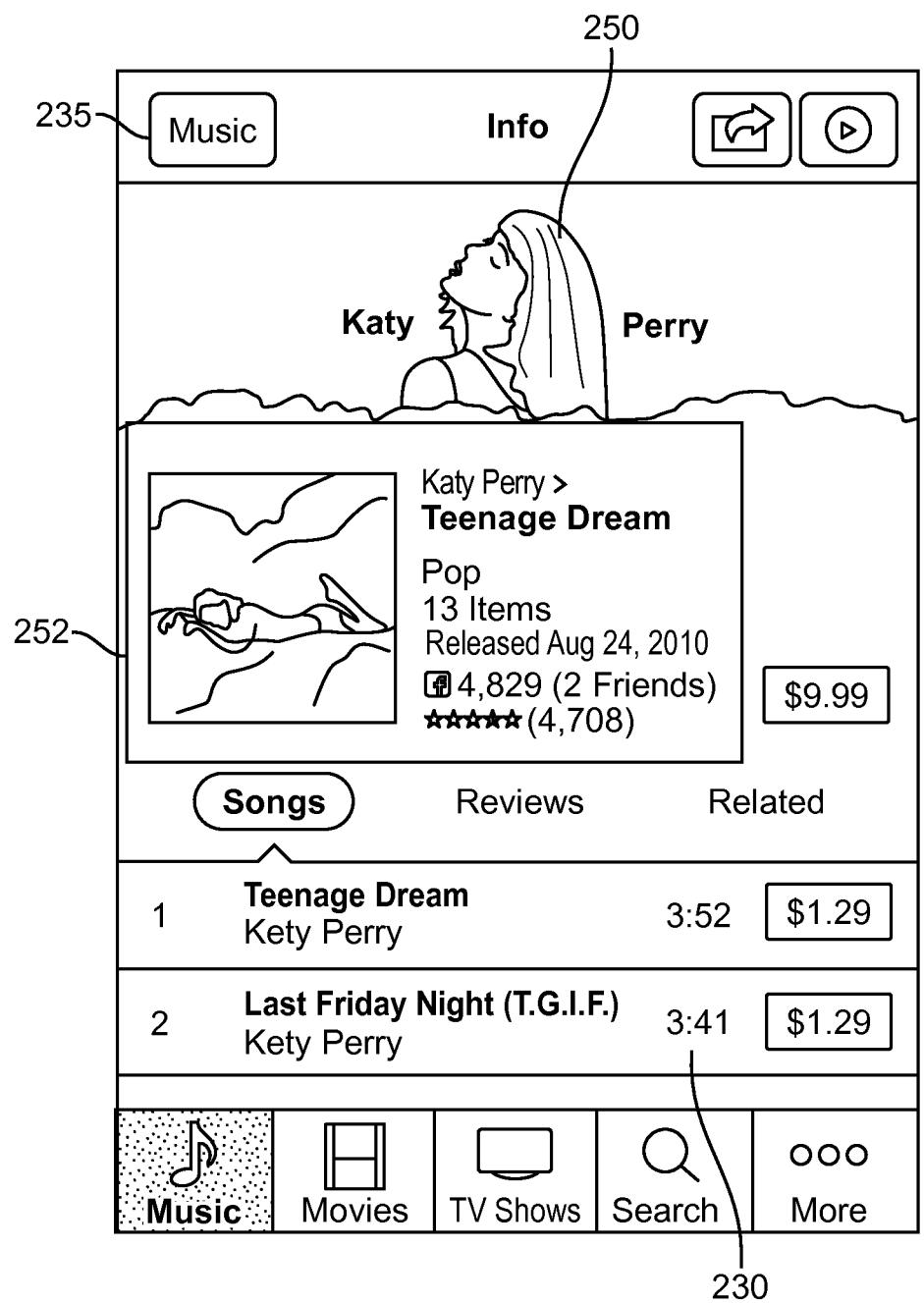
FIG. 4b illustrates an exemplary item interface.

FIG. 4b illustrates substantially the same interface as displayed in FIG. 4a except that it is configured for a smaller display.

Figure 12:
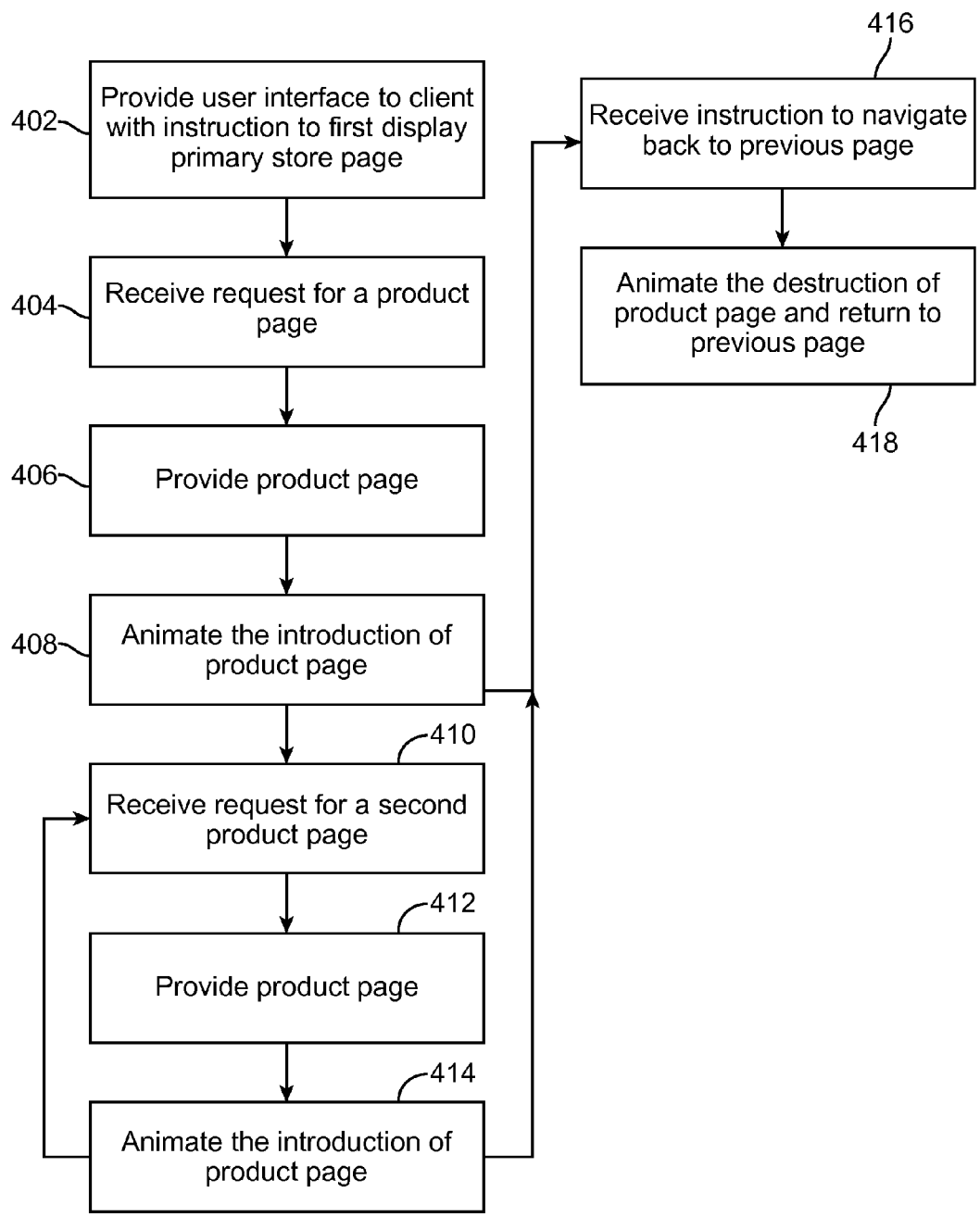
FIG. 12 illustrates an exemplary method of achieving browsing continuity.

The interfaces displayed in FIGS. 3a-4b are configured to provide better browsing continuity for a user of the online store. Namely, for each item that is selected, the interface will launch a new product page directly over the previous interface. Closing the product page interface or browsing backwards will return the user to the referring interface in the same condition as it was left. FIG. 12 illustrates an exemplary method of achieving such browsing continuity.

A server can provide a browsing interface for an online store 402 including instructions for the behavior of the interface. When a user identifies a product of interest, the user can select the product through the user interface. The server can receive a request for the product page 404 corresponding to the selected product, and provide that product page 406. Through the instructions already built into the initially provided interface, or through instructions received with the product page, the client computer is instructed to animate the introduction of the product page 408.

As discussed above, the animation for the introduction of product page provides the appearance that the product page jumps out of the selected product of the main page. In any event the animation illustrates the introduction of the product page directly above the interface from which the product was selected.

If another product is selected from the currently displayed product page, the server receives that request 410, provides the product page 412, and the new product page is introduced with similar animation 414, as discussed with respect to step 408 above. These steps can be repeated. Each time, the server will receive the product page request, provide the product page, and the new product page will be introduced above the previous one.

If a user wants to browse backwards, or close the most recent product page, the interface receives an instruction to navigate back to a previous page 416. The interface can then animate the destruction of the displayed product page and the interface is returned to the previously displayed page 418.

While the above method contemplates that the requests for new product pages must be sent to a server and the product page is downloaded, in some embodiments the product pages can be optimistically cached ahead of time.

Figure 5:
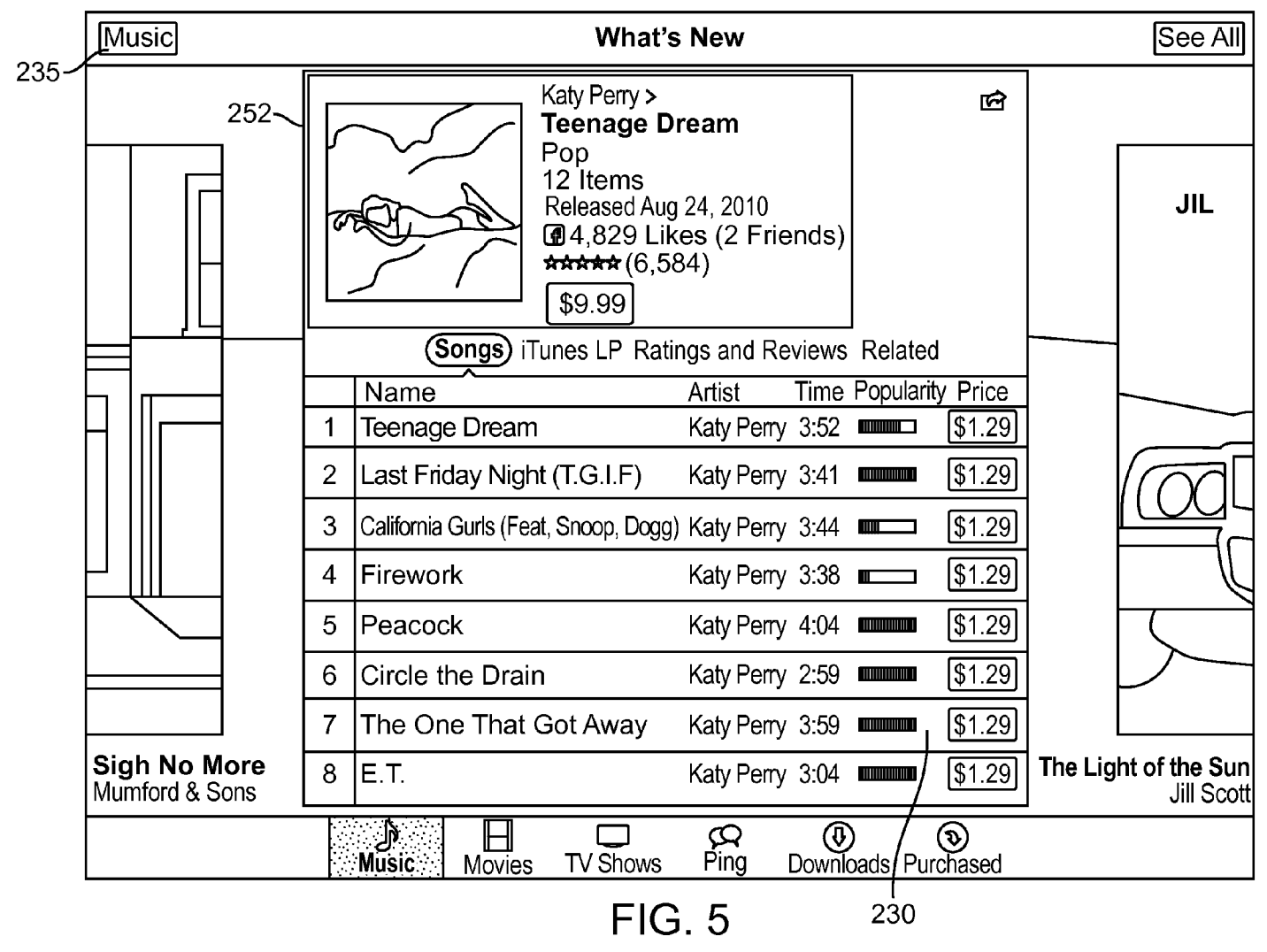

FIG. 5 illustrates an additional view of the item interface for item 230. The interface displayed in FIG. 4*a* can transition into the interface displayed in FIG. 5 upon receiving a scrolling command. As the list of songs is scrolled to reveal additional songs, the entire list expands by showing additional songs to take up the area made available by removing the artist artwork 250. Once the artist artwork 250 is completely removed, the album artwork and information 252 remains in place and the top items on the list can disappear while revealing additional items.

Figure 6A:
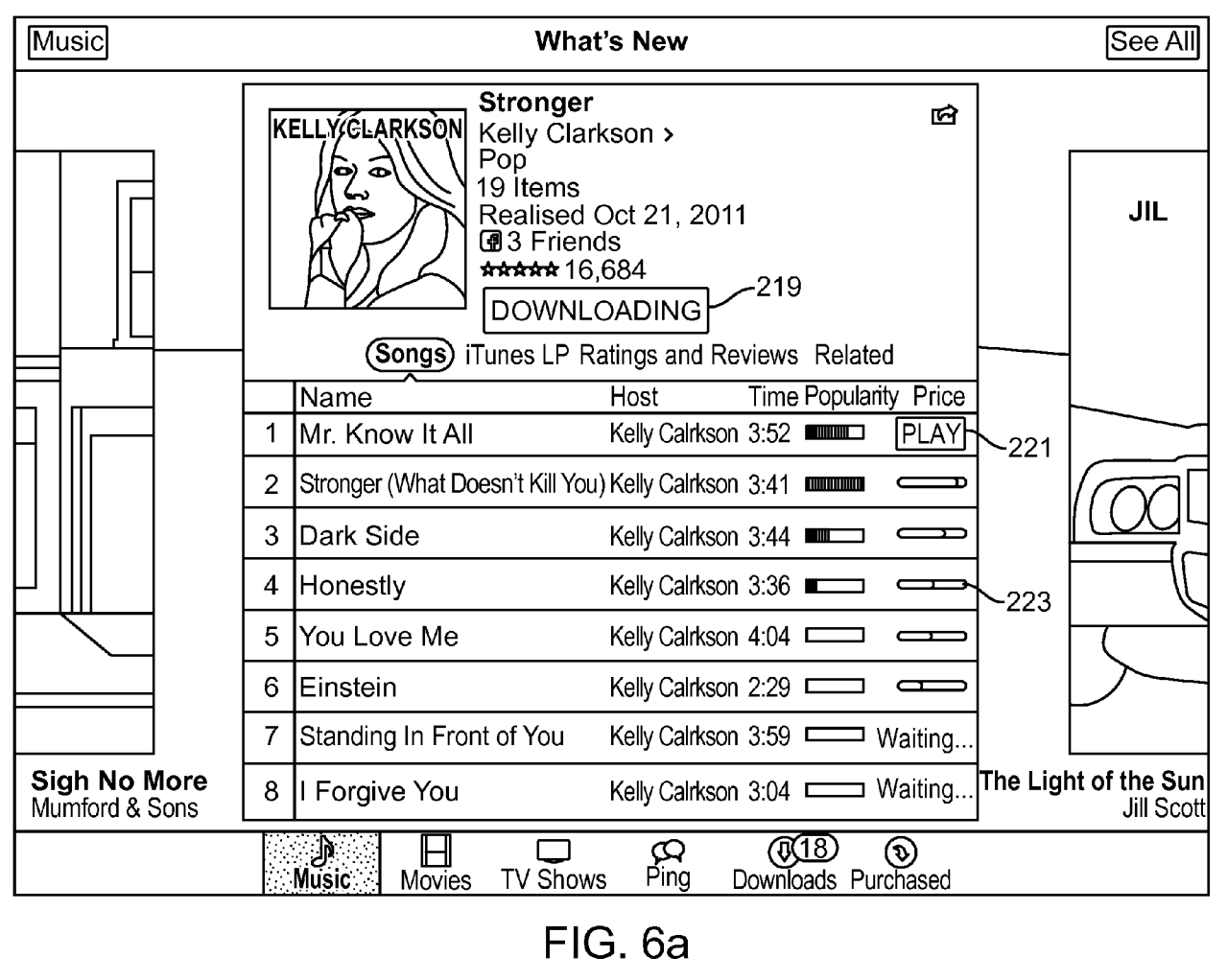

FIG. 6*a* illustrates the item interface for item 209 after receiving an input that selects button 219 in FIG. 3*a*. In FIG. 3*a* button 219 causes the songs of the album to be downloaded. In FIG. 6*a*, button 219 has transformed to now indicate that the album is downloading. Once a song has finished downloading, button 221 appears and indicates that the song is available for playback. If a selection input is received in button 221, the associated song can begin to play without leaving the current interface or online store. Also illustrated in FIG. 6*a* is download status indicators 223, which indicates the approximate status of a download for the item that is associated with the status indicator.

If a song is selected for playback or preview, prior art systems will begin playback of the song or preview, but when a user navigates away from the screen in which the playback or preview has been initiated, the playback ends. Such an action is undesirable because it interrupts the user's browsing experience. A user may want to preview a song while reading more about the song, album, or artist. A user may want to browse other items in the store. However, in prior art systems, if a user wants to hear the selected song playback/preview, then the user must wait for playback or preview to end before navigating on to other pages.

Figure 6B:
FIG. 6b illustrates an exemplary product interface displaying a download status of items associated with the product.

FIG. 6*b* illustrates substantially the same interface as illustrated in FIG. 6*a* except it is configured for a smaller display.

Figure 7A:
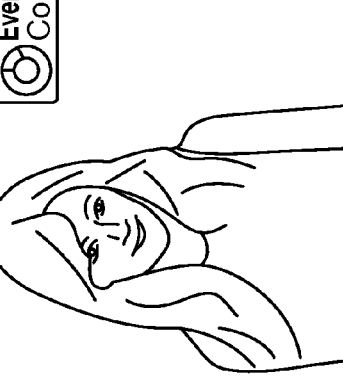
FIG. 7a illustrates an exemplary item preview interface embodiment.

FIG. 7*a* illustrates a solution to the problem of having previews terminate when the interface is browsed away from the preview page. FIG. 7*a* illustrates an embodiment wherein the user interface has received an input instructing the computer to play a preview of the song "Every Teardrop Is A Waterfall" by Coldplay, and thereafter the user interface receives an instruction to navigate back to the home screen. Rather than discontinue the preview, it continues, and the status of the preview is illustrated by interface element 270. Interface element 270 will appear on every screen navigated to by the user until the preview has completed or is terminated.

Figure 7B:
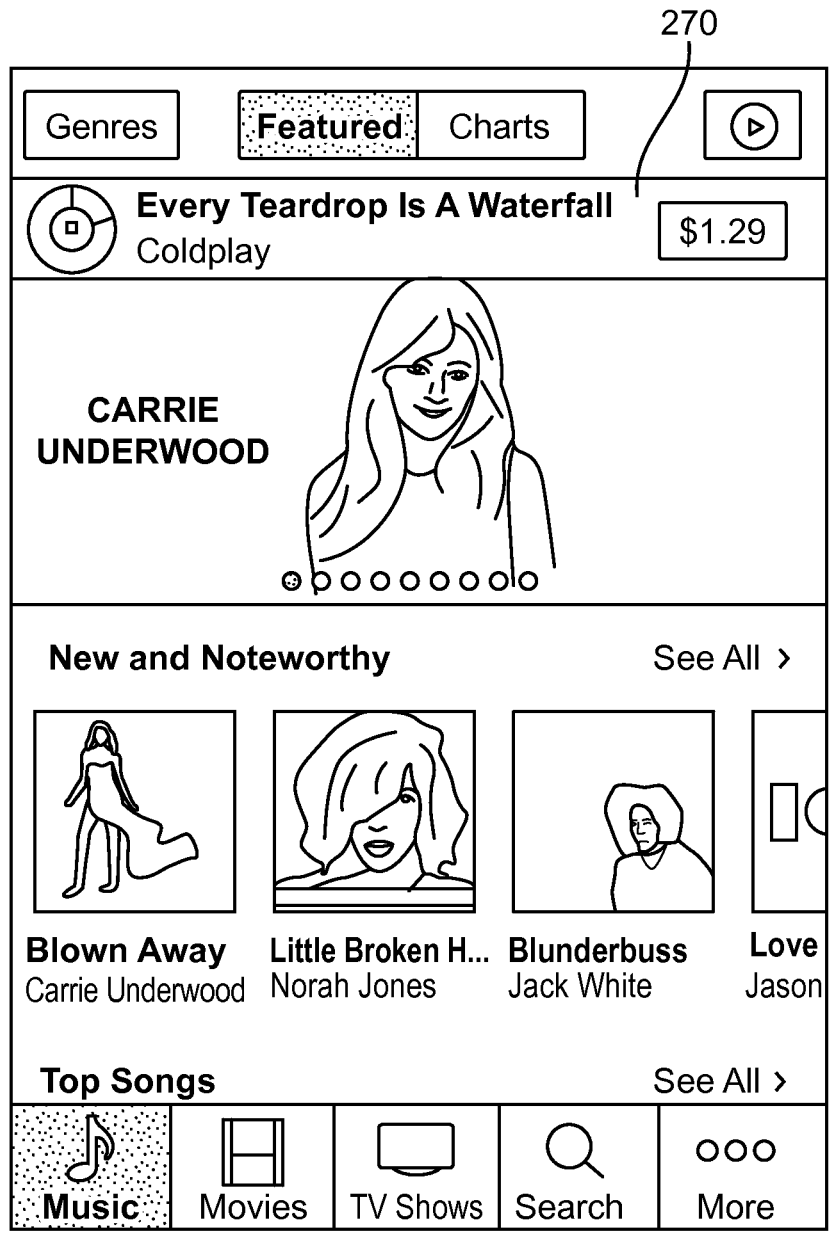
FIG. 7b illustrates an exemplary item preview interface embodiment.

FIG. 7*b* illustrates substantially the same interface as illustrated in FIG. 7*a*, except that it is configured for a smaller display.

Figure 8A:
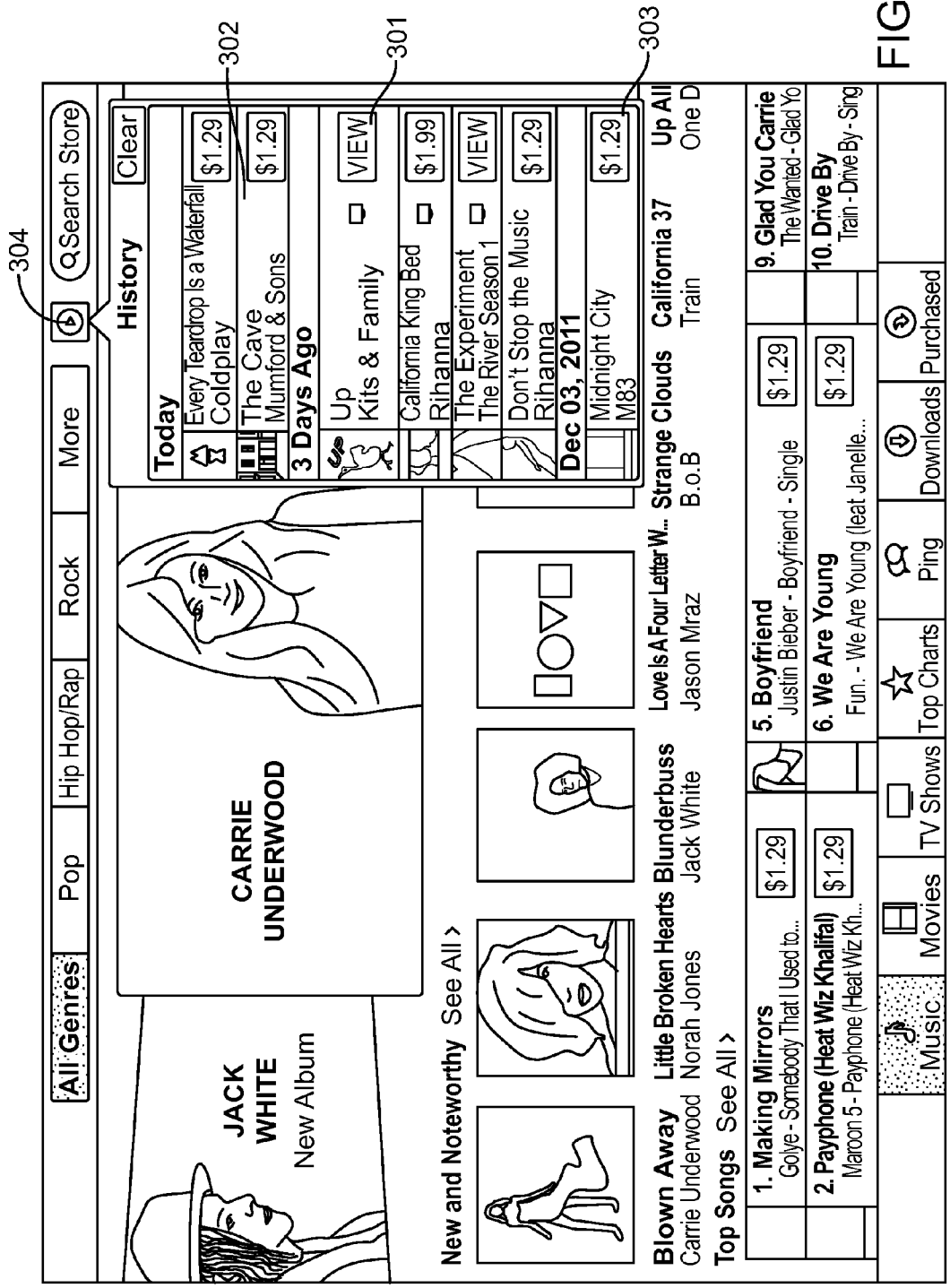
FIG. 8a illustrates an exemplary history menu interface.

FIG. 8*a* illustrates a history menu 302. The history menu 302 can be accessible from most/all pages in the store user interface by selecting a history icon 304. The history menu 302 can be displayed over any interface in the online store. For example in FIG. 8*a*, the history menu 302 is displayed on top of the main store interface.

In some embodiments the history menu is a collection of all history associated with a user account regardless of whether the items were experienced on the device presently browsing the online store or another device. By experienced, it is meant that an item represented in the history menu has been browsed, previewed, purchased, downloaded, or otherwise interacted with by a user, through one or more client devices under the user's direction.

As illustrated in FIG. 8*a*, items in the history menu 302 can be organized and grouped by date.

Each of the items can be interacted with directly from the history menu without needing to navigate away from the current interface. For example, item 301 has already been purchased and is available for viewing when the user interface receives an input in the view button. As another example, item 303 can be purchased directly from the history page when the user interface receives a selection of the button displaying the price of the item.

Further, despite the fact that the store page beneath the history menu 302 is specific to music items, the history menu 302 can display all items from the user's browsing history in menu 302.

In some embodiments the history menu 302 includes items that have already been purchased and downloaded. In such instances, the online store can present the history menu interface 302 with an instruction to link the playback button 301 ("view" in this figure, but could be "play" as an example) to a locally available copy of the item if the item is already stored or cached on the client device being used for browsing the online store. In another aspect of this embodiment, the client device that is browsing the online store did not download or cache the item, and in such aspect the online store can present the menu interface to link the playback button 301 to a remote resource.

Figure 8B:
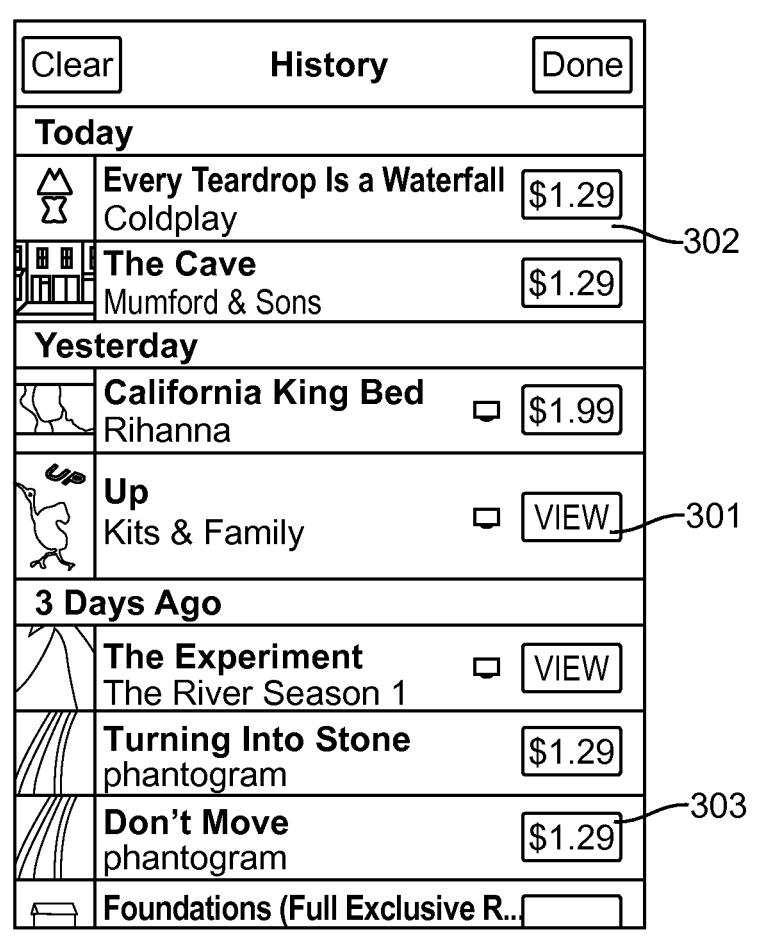

FIG. 8*b* presents a substantially similar history interface as displayed in FIG. 8*a*, expect that the interface illustrated in FIG. 8*b* is configured for a smaller screen. In FIG. 8*b*, the history interface is again displayed over the main page, but the history menu 302 occupies the full screen, and the main page is obscured from view.

Figure 13:
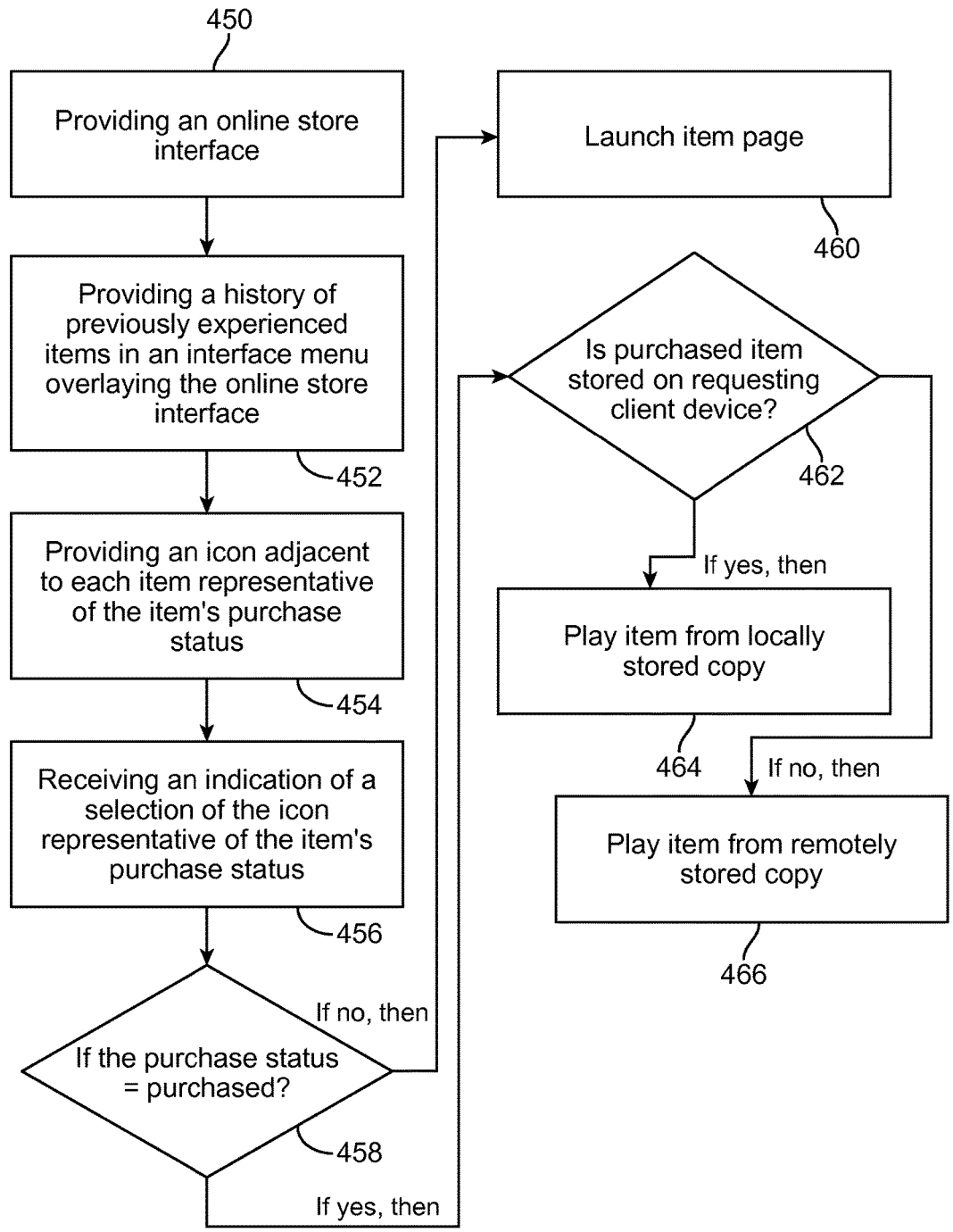
FIG. 13 illustrates an exemplary method of providing a history menu.

FIG. 13 illustrates an exemplary method of providing a history menu such as illustrated in FIG. 8*a* and FIG. 8*b*. The online store provides an online store interface 450, and can track and record a history of experienced items. When a user requests to see a history of experienced items, the server provides the history 452 for display over the online store interface. The server also provides an icon adjacent to each item representative of the item's purchase status 454. An item's purchase status can be for example whether the item has been purchased, whether the item has been previewed, etc.

When the interface receives a selection of the button representative of the item's purchase status 456, the interface will respond according to the displayed purchase state. If the purchase status is purchased 458, then it is determined whether the purchased item is stored on the requesting device 462. If the item is stored on the requesting device, the item can be played from the local copy 464. If the item is not stored on the requesting device, then the item can be played from a remotely stored copy 466, such as from a cloud server.

If at 458, the item had not been purchased then the item page can be launched 460.

Figure 9:
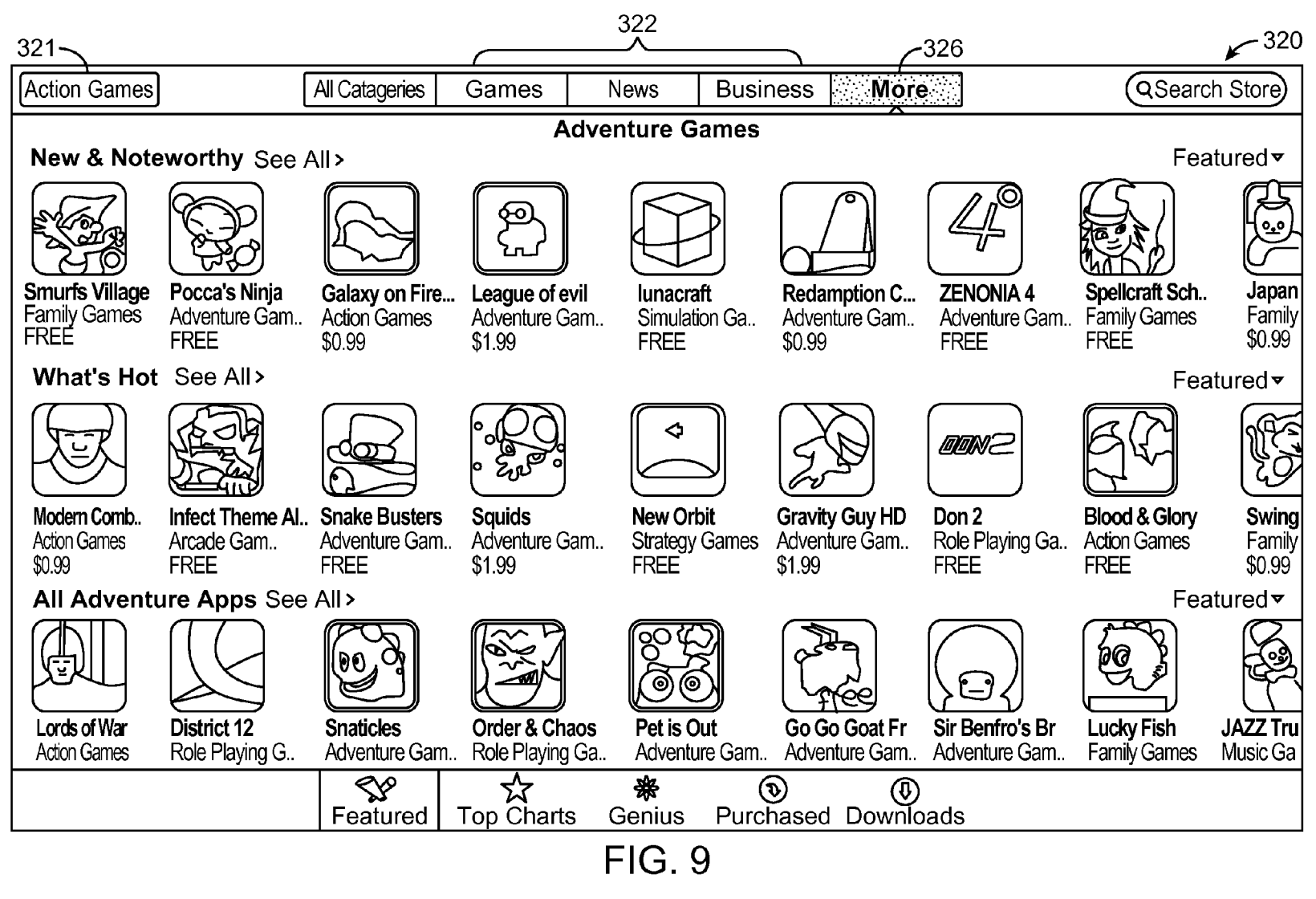

FIG. 9 illustrates an exemplary store interface pertaining to games. However, it should be appreciated that just like the other interfaces disclosed herein, the interface can be used with any product.

FIG. 9 illustrates an interface within the online store listing category sections. In this screen, the interface lists categories of "Adventure Games:" "New & Noteworthy," "What's Hot," and "All Adventure Apps."

FIG. 9 also illustrates a category tabs bar 320. Tab 321, which is one of the tabs in the category tabs bar 320, corresponds to the currently displayed page, while the rest of the tabs function as bookmarks for other categories of items within the online store. Additional categories 330 can be displayed when a user input is received in the user interface selecting the "More" button 326. If a selection input is received associated with one of the categories in the "More" categories list, the interface can navigate to a page specific for one of those categories.

Figure 10:
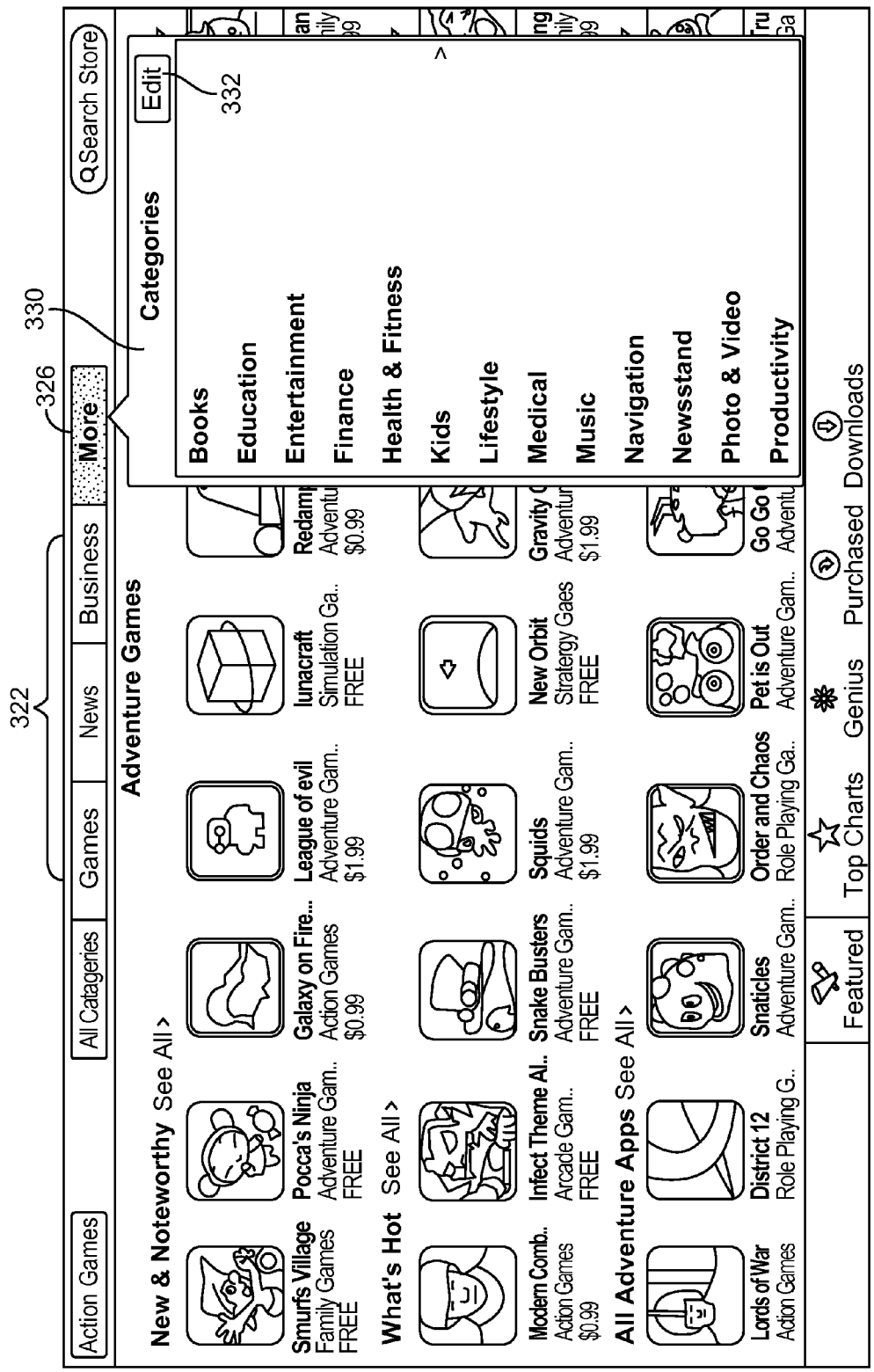
FIG. 10 illustrates an exemplary interface of category listings.

In some embodiments, it is desirable to allow a user to organize which category sections are presented in the category tabs bar 320 and the order of those category sections. For example, the categories labeled as 322 can be editable or custom selected tabs. In such embodiments, the editable tabs 322 can be edited when the "edit" button 332 is selected from the more categories listing 330 illustrated in FIG. 10. Additionally, while the category tabs bar 320 is illustrated with three categories, in some embodiments a different number of categories can be displayed, e.g. more or less categories. Furthermore, in some embodiments, a different number of categories can be displayed based on the device types. For example, four categories can be displayed in a category tabs bar on a desktop device, while only two categories can be displayed in a category tabs bar on a mobile device.

Figure 11:
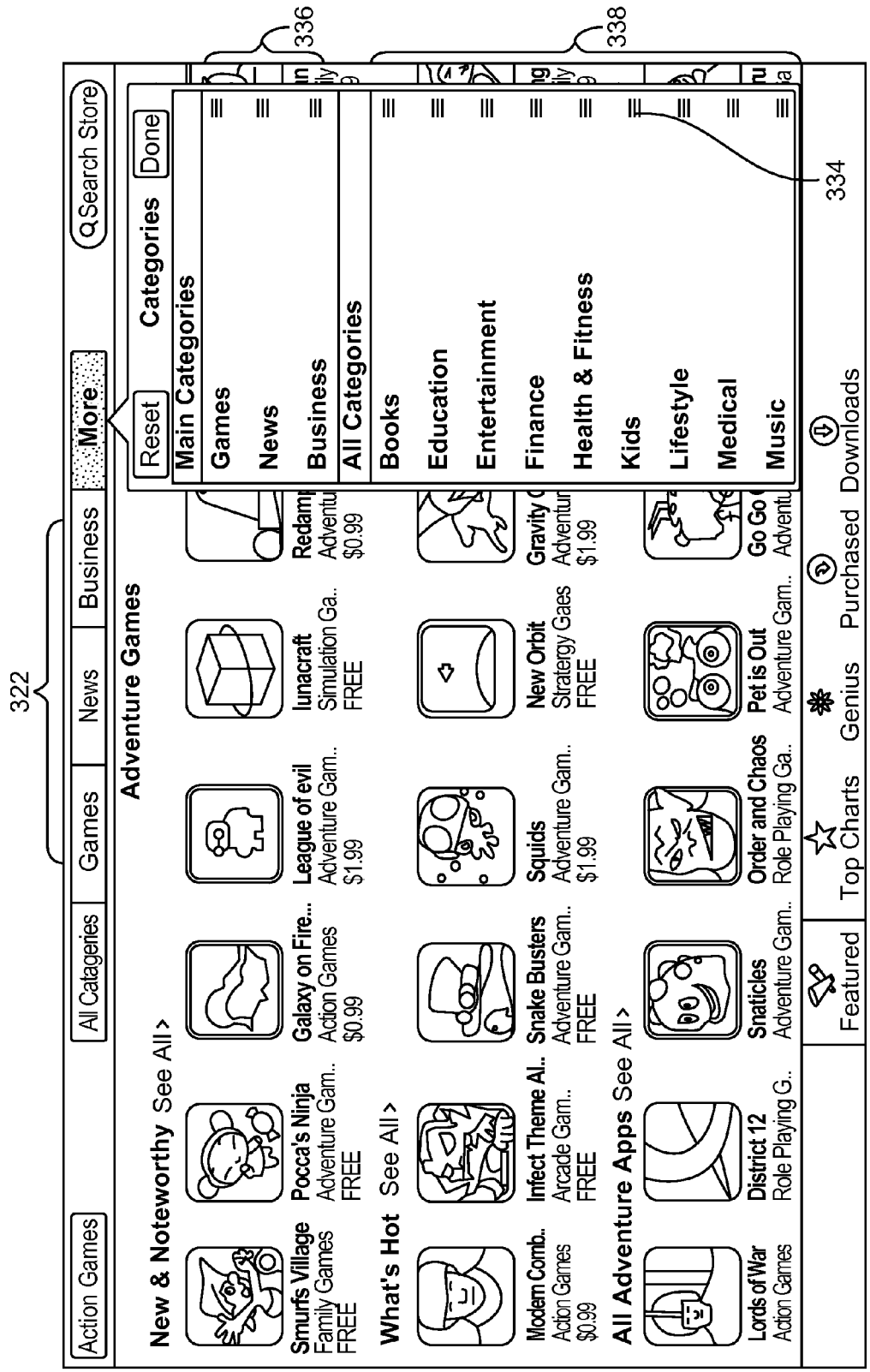
FIG. 11 illustrates an exemplary category listing interface when it is in an editable state.

FIG. 11 illustrates the category listing when it is in an editable state. Items can be moved when a selection and drag action is received, with respect to an item, on icon 334. The category listing 330 includes two primary sections, "main categories" 336, and "all categories" 338. The categories placed into the main categories section are those categories that correspond with the categories displayed in the category tabs bar as one of categories 322. As illustrated in FIG. 11 the three categories in the "main categories" section are "games," "news," and "business," and they correspond to the categories displayed as the editable tabs 322. When a category in the "all categories" section 338 is dragged into the "main categories" section 336, that category will replace the bottom category in the "main categories" section 336, and will be displayed in the category tabs bar.

In some embodiments the rearranged categories can be stored on a server associated with the online store. In such embodiments the category preferences can be displayed on any device associated with the same user account that is used to access the online store.

In some embodiments, the category preferences can be displayed only on selected device types used to access the online store. For example, the category preferences might only be displayed when the device used to access the online store is a tablet, laptop, or desktop computer, but the category preferences will not be displayed when the store is accessed via a mobile phone or portable media player.

Figure 14:
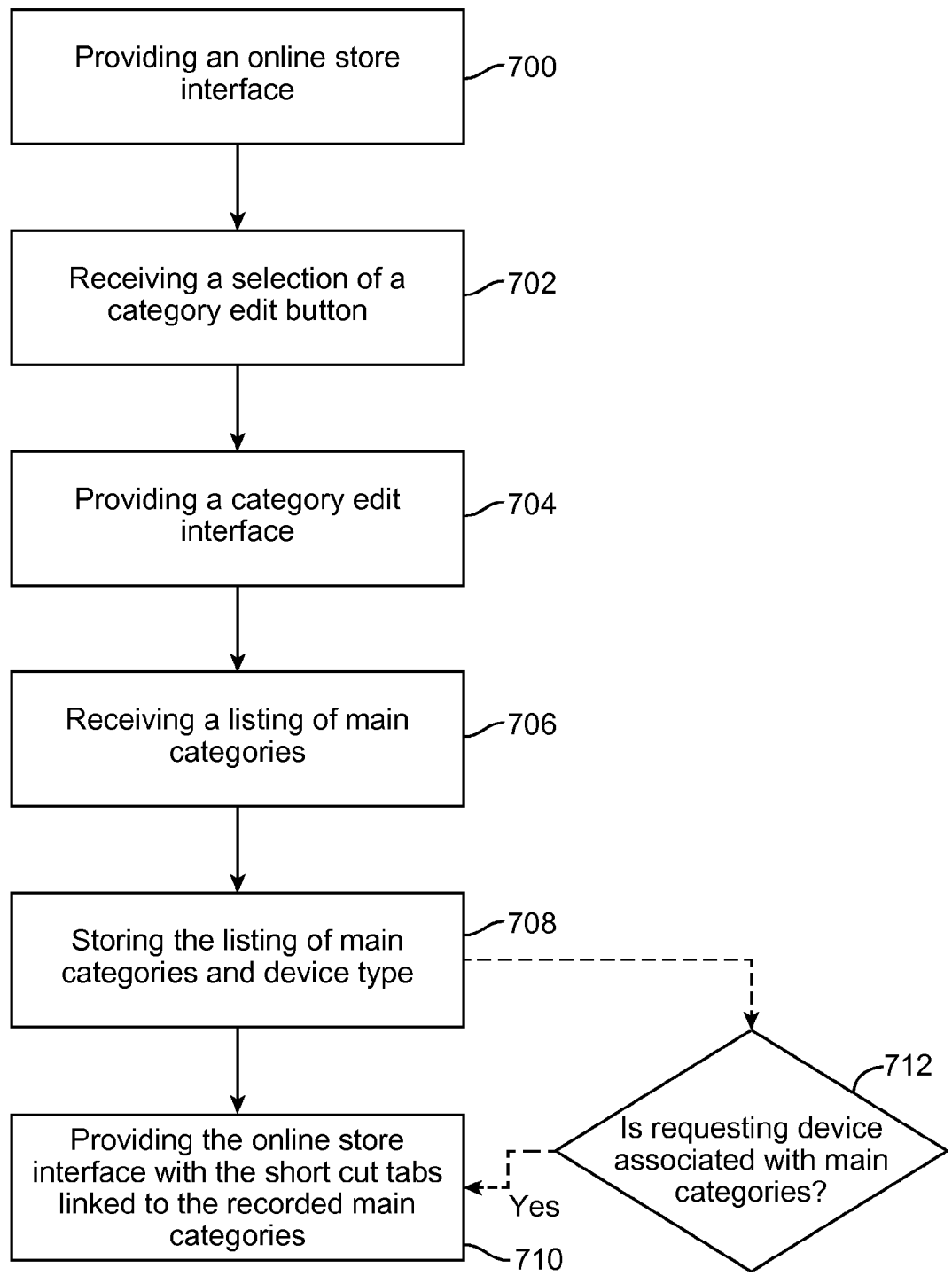
FIG. 14 illustrates an exemplary method for reordering or specifying category preferences.

FIG. 14 illustrates an exemplary method for reordering or specifying category preferences. The online store server provides an online store interface 700, and through the online store interface, the server receives an indication that the user desires to edit the preferred categories 702. The server can provide an interface to edit the categories 704. From the category editing interface, the server can receive a new list of "main categories" 706 and store those categories along with a device type 708. The device type can be the type of device that was used to make the edits, whereby the server will only provide those categories as the preferred categories when the store is accessed by the same type of device 712 (optional). Alternatively the device type can apply to a large screen or small screen display, and the server will provide those categories as the preferred categories when a device accesses the store with a screen having the matching format 712 (optional).

When the online store interface is accessed in future visits, the server can provide the interface with the preferred categories presented as short-cut tabs 710.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A computer-implemented method comprising:
    presenting, by a client device, an online store interface on a display of the client device, wherein the client device is associated with a user account for accessing an online store server;
    presenting, by the client device, a history interface overlaying the online store interface and listing a history of previously experienced items, wherein the history of previously experienced items includes all previously experienced items experienced on any of a plurality of client devices associated with the user account, up to a limit, regardless of a purchase status, wherein the previously experienced items are each associated with a performance button;
    in response to receiving a first user input indicating selection of a first performance button corresponding to a first item, performing, by the client device, the first item;
    during performance of the first item, receiving a second user input indicating that a user would like to navigate from the history interface to the online store interface;
    in response to receiving the second user input, removing the history interface overlaying the online store interface, wherein the first item continues to be performed uninterrupted.

2. The computer-implemented method of claim 1 further comprising:
    downloading the first item selected and making the first item available for playback selection without leaving the online store interface.

3. The computer-implemented method of claim 2, further comprising:
    making the first item available for playback selection within the history interface.

4. The computer-implemented method of claim 2, wherein the making the first item available for playback selection includes:
    providing the client device with an instruction to present the performance button corresponding to the first item, the instruction specifying a link between the performance button corresponding to the first item and a server resource where the client device can retrieve the first item.

5. The computer-implemented method of claim 1, wherein the previously experienced items presented in the history interface are organized by a date that the previously experienced items were experienced.

6. The computer-implemented method of claim 1, wherein the previously experienced items include media items that have been browsed, previewed, purchased, downloaded, or otherwise interacted with by a user, through any of the plurality of client devices under the user's direction.

7. The computer-implemented method of claim 1, further comprising:
    after removing the history interface, presenting a performance interface element overlaying the online store interface, the performance interface element being smaller than the history interface element and indicating that the first item is being performed.

8. A client device comprising:
    one or more computer processors; and
    a memory storing instructions that, when executed by the one or more computer processors, cause the client device to:
        present an online store interface on a display of the client device, wherein the client device is associated with a user account for accessing an online store server;
        present a history interface overlaying the online store interface and listing a history of previously experienced items, wherein the history of previously experienced items includes all previously experienced items experienced on any of a plurality of client devices associated with the user account, up to a limit, regardless of a purchase status, wherein the previously experienced items are each associated with a performance button;
        in response to receiving a first user input indicating selection of a first performance button corresponding to a first item, perform the first item;
        during performance of the first item, receive a second user input indicating that a user would like to navigate from the history interface to the online store interface;
        in response to receiving the second user input, remove the history interface overlaying the online store interface, wherein the first item continues to be performed uninterrupted.

9. The client device of claim 8, wherein the instructions further cause the client device to:
    download the first item selected and making the first item available for playback selection without leaving the online store interface.

10. The client device of claim 9, wherein the instructions further cause the client device to:
    making the first item available for playback selection within the history interface.

11. The client device of claim 9, wherein the making the first item available for playback selection includes:
    providing the client device with an instruction to present the performance button corresponding to the first item, the instruction specifying a link between the performance button corresponding to the first item and a server resource where the client device can retrieve the first item.

12. The client device of claim 8, wherein the previously experienced items presented in the history interface are organized by a date that the previously experienced items were experienced.

13. The client device of claim 8, wherein the previously experienced items include media items that have been browsed, previewed, purchased, downloaded, or otherwise interacted with by a user, through any of the plurality of client devices under the user's direction.

14. The client device of claim 8, wherein the instructions further cause the client device to:
    after removing the history interface, present a performance interface element overlaying the online store interface, the performance interface element being smaller than the history interface element and indicating that the first item is being performed.

15. A non-transitory computer-readable medium storing instructions that, when executed by a client device, cause the client device to:
    present an online store interface on a display of the client device, wherein the client device is associated with a user account for accessing an online store server;
    present a history interface overlaying the online store interface and listing a history of previously experienced items, wherein the history of previously experienced items includes all previously experienced items experienced on any of a plurality of client devices associated with the user account, up to a limit, regardless of a purchase status, wherein the previously experienced items are each associated with a performance button;
    in response to receiving a first user input indicating selection of a first performance button corresponding to a first item, perform the first item;
    during performance of the first item, receive a second user input indicating that a user would like to navigate from the history interface to the online store interface;
    in response to receiving the second user input, remove the history interface overlaying the online store interface, wherein the first item continues to be performed uninterrupted.

16. The non-transitory computer-readable medium of claim 15, wherein the instructions further cause the client device to:
    download the first item selected and making the first item available for playback selection without leaving the online store interface.

17. The non-transitory computer-readable medium of claim 16, wherein the instructions further cause the client device to:
    making the first item available for playback selection within the history interface.

18. The non-transitory computer-readable medium of claim 16, wherein the making the first item available for playback selection includes:
    providing the client device with an instruction to present the performance button corresponding to the first item, the instruction specifying a link between the performance button corresponding to the first item and a server resource where the client device can retrieve the first item.

19. The non-transitory computer-readable medium of claim 15, wherein the previously experienced items presented in the history interface are organized by a date that the previously experienced items were experienced.

20. The non-transitory computer-readable medium of claim 15, wherein the previously experienced items include media items that have been browsed, previewed, purchased, downloaded, or otherwise interacted with by a user, through any of the plurality of client devices under the user's direction.

21. The non-transitory computer-readable medium of claim 15, wherein the instructions further cause the client device to:
    after removing the history interface, present a performance interface element overlaying the online store interface, the performance interface element being smaller than the history interface element and indicating that the first item is being performed.

* * * * *